May 6, 1958 M. W. McKAY ET AL 2,833,992
SUPPRESSED CARRIER MODULATION SYSTEM
Filed Oct. 6, 1955
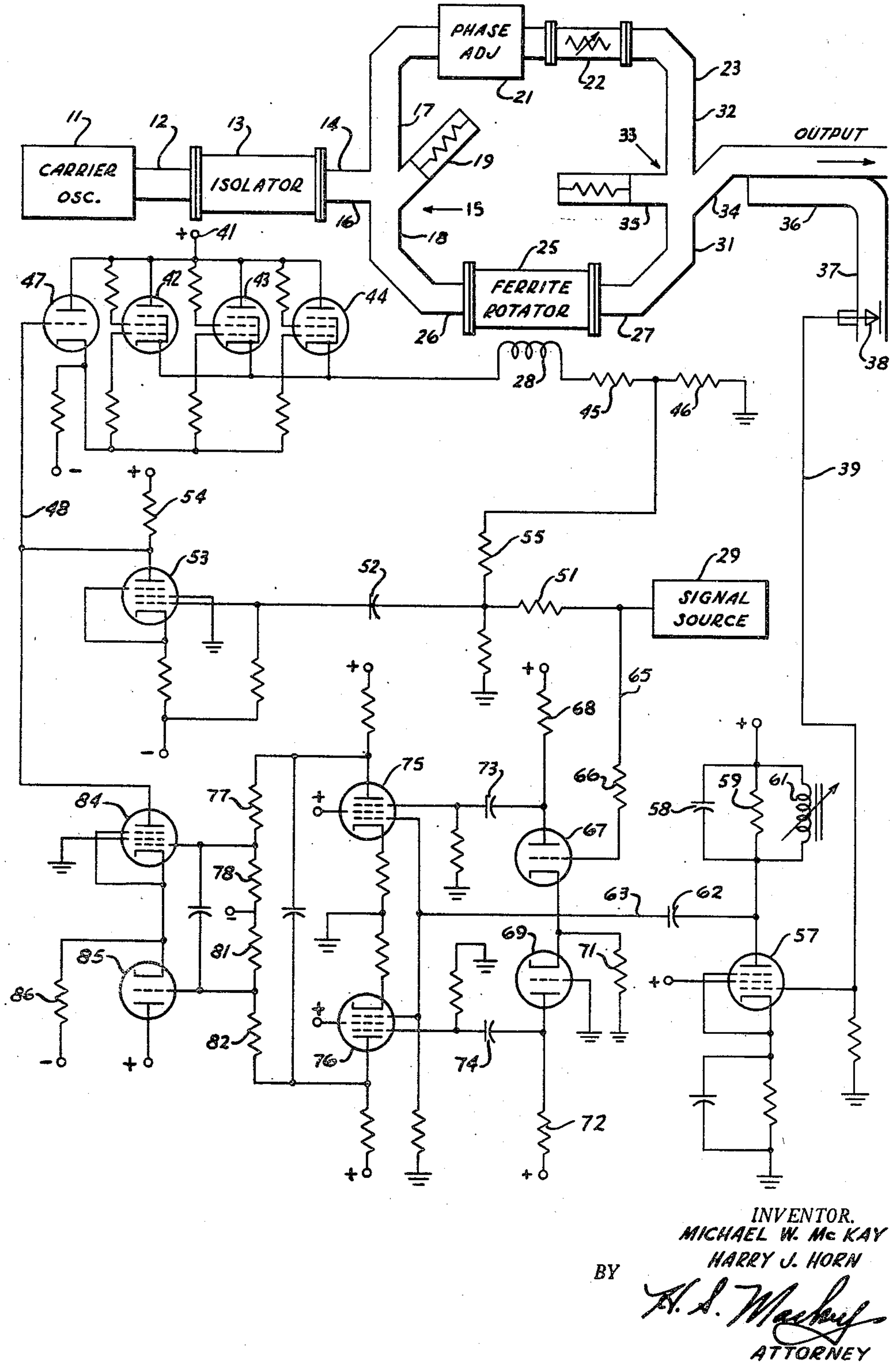
INVENTOR.
MICHAEL W. Mc KAY
HARRY J. HORN
BY
ATTORNEY United States Patent Office 2,833,992

Patented May 6, 1958

2,833,992

SUPPRESSED CARRIER MODULATION SYSTEM

Michael W. McKay, Tarrytown, and Harry J. Horn, Pleasantville, N. Y., assignors to General Precision Laboratory Incorporated, a corporation of New York Application October 6, 1955, Serial No. 538,938

9 Claims. (Cl. 332—44)

This invention relates generally to amplitude modulation systems and particularly to a modulation system having a dual sideband suppressed carrier output.

Many continuous wave modulation systems have been devised in the past for producing either a single or dual sideband output with the carrier suppressed. However, few, if any, of these systems are suitable for use at frequencies in the microwave region. The invention about to be described is therefore particularly advantageous since it is applicable both to microwave frequencies and to lower frequencies.

It is a general object of this invention to provide a dual sideband suppressed carrier modulation system.

A more specific object is to provide a dual sideband suppressed carrier modulator which is suitable for use at frequencies in the microwave region.

Another object is to provide a suppressed carrier modulator in which presence of the carrier in the output automatically adjusts the apparatus to reduce the amplitude of the vestigial carrier.

In accordance with the invention, the source of carrier frequency oscillations is connected to two transmission paths. The source of signal frequency oscillations is impressed upon a modulator which is located in one of the transmission paths. The energy in this path, after passing through the modulator, therefore contains energy in sidebands and at the carrier frequency. The two paths are connected to opposite arms of a hybrid junction and the phase and amplitude of the carrier in one of the paths is adjusted so that, at the hybrid junction, the carriers in the two paths are of equal amplitude but of opposite phase. The carrier is therefore transmitted solely to one adjacent arm, where it is absorbed, while one-half of the sideband energy passes to the remaining arm of the junction. If desired, means may be provided in the remaining arms for detecting the presence of vestigial amounts of carrier and for automatically adjusting the amplitude of the carrier in one of the paths so as to reduce the vestigial carrier.

The invention as briefly described above may be more clearly understood by reference to the following detailed description and the accompanying drawing the single figure of which is a schematic diagram of a specific embodiment of the invention.

Referring now to the drawing there is shown a specific embodiment of the invention suitable for use on microwave frequencies. There is shown a source of carrier oscillations 11 which may, for example, be a klystron oscillator operating in the region of nine or ten thousand megacycles. The output of the oscillator 11 is led by means of a waveguide 12 to a ferrite isolator 13 which prevents reflected energy from adversely affecting the oscillator. This isolator may operate on the principles described in the Luhrs and Tull Patent No. 2,644,930 and may comprise a ferrite element within a waveguide and a permanent magnet of sufficient strength to rotate microwave energy entering the isolator from the guide 12 through 45°. The output waveguide 14 is turned at an angle of 45° with respect to the guide 12 so that energy from the oscillator 11 may flow through the isolator 13 with very little attenuation. However, microwave energy entering the isolator from the guide 14 will be rotated an additional 45° so that it cannot be propagated in the guide 12, but will be absorbed by a suitable resistance card within the isolator 13. An isolator such as described may be purchased fom the Cascade Research Corporation of Los Gatos, California, under the name "Uniline."

The waveguide 14 is connected to one arm of a waveguide hybrid junction or magic tee denoted generally by the reference character 15. Like other hybrid junctions, such as those commonly used for lower frequencies, the energy entering one arm will divide evenly between the adjacent arms, but no energy will appear in the opposite arm. The waveguide 14 may, for example, be connected to the series arm 16 in which case it will appear with equal amplitude, but opposite phase in the collinear arms 17 and 18 while no energy will appear in the shunt arm 19. The arm 19 contains a resistive termination so that any power entering the magic tee 15 from arms 17 and 18 will be absorbed, either in the resistive termination of arm 19 or in the isolator 13.

The arm 17 is connected to a first transmission path which contains a phase adjustor 21 which may be any of various well-known constructions. For example, the phase adjustor may be an arrangement for deforming the waveguide thereby changing the guide wavelength, or it may be an arrangement for adjustably inserting a dielectric into the guide for the same purpose. The output of the phase adjustor 21 is connected to an attenuator 22 which may, for example, comprise a resistive element which may be inserted an adjustable amount into a waveguide. The output of the attenuator 22 is passed to a waveguide section 23.

A second transmission path is connected to the collinear arm 18 and contains a ferrite rotator 25 which is used as a modulator. This rotator may also operate on the principles discussed in the aforementioned Patent No. 2,644,930. However, the input waveguide 26 and the output waveguide 27 are collinear rather than rotated with respect to one another and a coil 28 is provided to create a magnetic field through circuits which will be more fully explained subsequently. The coil 28 normally carries a direct current sufficient to cause the microwave energy in the input guide 26 to be rotated by approximately 45°. Therefore a part of the energy incident upon guide 27 will be propagated therethrough while the remainder will be reflected. The rotator 25 may also include a resistance card to absorb the reflected energy. Superimposed upon the direct current flowing through coil 28 is an alternating current obtained from signal source 29 through circuits to be more fully discussed. The source 29 may be of any signal frequency desired and in one specific embodiment was made to be adjustable from five to forty kilocycles. The alternating current in coil 28 therefore causes the microwave energy flowing through the rotator to be attenuated more or less in accordance with the signal from the source 29. Therefore, the output in waveguide 27 contains energy at the carrier frequency of oscillator 11 and also at sideband frequencies equal to the sum and the difference in frequencies between the oscillator 11 and the signal source 29.

The waveguides 23 and 27 are connected to opposite arms 31 and 32 of a second magic tee indicated generally by the reference character 33. The two arms 31 and 32 may, for example, be the two collinear arms while the useful output is taken from the shunt arm 34. The series arm 35 is terminated in an absorptive load. The output arm 34 has a directional coupler 36 coupled thereto in order to extract a small amount of the output energy for control purposes. A waveguide 37 connected to the directional coupler 36 contains a rectifier 38 for detecting the energy in the guide and passing the detected energy to a conductor 39.

The apparatus so far described operates as follows. The microwave energy from the oscillator 11 passes through the isolator 12 to the magic tee, the energy appearing with equal amplitude but with opposite phase in arms 17 and 18. The energy in arm 18 passes through the rotator 25 where it is modulated by the signal source 29 and appears in the arm 31 of the magic tee 33. The energy in arm 17 passes through the phase adjustor 21 and the attenuator 22 to the arm 32 of the magic tee 33. In passing through the rotator 25 both the phase and amplitude of the energy are altered somewhat and to compensate for this the phase adjustor 21 and attentuator 22 are adjusted so that the carrier frequency energy appearing in arms 31 and 32 is of equal amplitude but opposite phase. As long as this balance is maintained, all of the carrier frequency energy from arms 31 and 32 will be transmitted to the series arm 35 where it will be absorbed by the resistive load while none of the carrier energy will appear in the shunt arm 34. However, the sideband energy, which appears in arm 31 only will divide equally between the arms 34 and 35 so that the arm 34 contains an output consisting of the sidebands only with the carrier suppressed.

The various circuits for controlling the current in the coil 28 will now be described. The current is supplied from a source of direct current schematically indicated by the terminal 41 and flows through three parallel connected beam power tubes 42, 43 and 44 operating as cathode followers, through the coil 28, and two serially connected resistors 45 and 46 to ground. The grids of the tubes 42, 43 and 44 have their potential controlled by a triode 47 also connected as a cathode follower so that the potential on the conductor 48, connected to the grid of the triode, controls the current through the coil 28. The various voltages and biasing resistors are selected so that in the absence of a signal on conductor 48 the current through the coil 28 is sufficient to rotate microwave energy in the wave guide 26 through approximately 45°. The exact amount of rotation is not critical but 45° gives the widest latitude in the design of the remaining circuits.

The current in coil 28 must also be varied in accordance with the modulation signals from the source 29 and this is accomplished by connecting the source 29 through a resistor 51 and a capacitor 52 to the grid of a pentode amplifier tube 53 having a plate load resistor 54. The anode of the tube 54 is connected to the conductor 48 so that the signal variations of the source 29 appear in amplified form on conductor 48 and thereby vary the current through the coil 28. The tubes 53 and 47 and the cathode followers 42, 43 and 44 constitute an amplifier circuit with the coil 28 as the load and the linearity of this circuit is improved by a negative feedback loop in which the output potential appearing across resistor 46 is connected to the input circuit of tube 53 through a resistor 55.

As previously explained, the phase adjustor 21 and the attenuator 22 are initially adjusted to minimize the amount of carrier energy in the output arm 34. It has been found that the phase adjustment will remain sufficiently constant after once being adjusted, but the amplitude control requires continuous adjustment in order to keep the level of the carrier low enough. Therefore an automatic adjustment is provided.

It is a well-known principle that if a signal comprising a carrier frequency and two sidebands is linearly detected, the output will have a frequency equal to the modulating frequency. It is also well known that if a signal comprising two sidebands only with the carrier suppressed is linearly detected, the output will have a frequency equal to twice the modulating frequency. If the signal contains a vestigial amount of carrier both the modulation frequency and twice the modulation frequency will appear in the detected output. It has been found that as the amplitude of the carrier energy in one of the arms of the bridge is adjusted the amount of carrier energy in the output will pass through zero and at the same time the detected signal having the frequency of the modulation signal will also pass through zero and undergo a phase reversal. It is therefore possible to utilize the modulation frequency in conductor 39 as an error signal to adjust the attentuation in one of the arms of the bridge so that the amount of carrier in the output is held to a minimum. In the present case this error signal controls the amplitude of the carrier by controlling the current through coil 28 which of course varies the attenuation of the microwave energy passing through the rotator 25. It would also be possible to use the signal in conductor 39 to control an attenuator in either of the two transmission paths.

The signal in conductor 39 which contains energy at both the modulation frequency and at twice the modulation frequency is led to the grid of a pentode amplifier 57. The anode circuit of this tube contains a filter comprising a capacitor 58, a resistor 59 and an inductance 61 connected in parallel and in series with the source of anode voltage. This filter is for the purpose of attenuating the energy at twice the modulation frequency and for passing only that energy which is near the modulation frequency. As shown in the drawing this filter comprises a band-pass filter but might alternatively comprise a low-pass filter since it is only necessary to attenuate the second harmonic of the desired frequency. The output of this amplifier stage is taken from the anode and coupled by the means of capacitor 62 to the conductor 63. The signal in conductor 63 is therefore at the modulation frequency and its amplitude indicates extent of the maladjustment while its phase indicates the sense. It is therefore necessary to determine the phase of the signal in conductor 63.

The voltage from the signal source 29 is led by means of a conductor 65 and resistor 66 to the grid of a triode 67 having a plate load resistor 68. Another triode 69 has its cathode connected to that of triode 67 and both are grounded through a common cathode resistor 71. The grid of triode 69 is grounded while the anode is connected through a load resistor 72 to a source of positive potential. By this arrangement, the anodes of tubes 67 and 69 will bear a balanced, or push-pull, signal corresponding to the signal from the source 29. The triodes 67 and 69 preferably are high gain triodes somewhat overdriven so that clipping takes place whereby the output at the anodes is approximately a square wave at the modulation frequency. These signals are led through coupling capacitors 73 and 74 to the suppressor grids of pentodes 75 and 76 respectively. These tubes are therefore alternately gated on at the modulation frequency. The signal on conductor 63 is connected to the control grids of pentodes 75 and 76 in parallel so that one or the other of these tubes will conduct depending upon the phase of the signal on conductor 63 with respect to the phase of the modulation source 29. The anodes of tubes 75 and 76 are connected together through a voltage divider comprising four serially connected resistors 77, 78, 81 and 82. The voltage drop across these resistors will therefore be positive or negative depending upon the phase of the signal in conductor 63. Intermediate points of voltage divider are connected respectively to the grids of a pentode 84 and a triode 85, the cathodes of which are connected together and to a source of negative potential through a common cathode resistor 86. The anode of pentode 84 is connected to conductor 48 and receives its supply voltage through the common plate resistor 54. Therefore the potential of the anode of tube 84 and the potential of conductor 48 will increase or decrease depending upon the amount and phase of the carrier frequency appearing in the output arm 34 of the magic tee 33. This variation of potential in conductor 48 will operate through the triode 47 and the cathode followers 42, 43 and 44 to adjust the current in coil 28 so as to minimize the carrier which appears in arm 34.

Although a specific embodiment has been described, many modifications can be made within the scope of the invention. For example, the arrangement of the two magic tees is illustrative only. The isolator 13 could be connected to the shunt arm, in which case the energy in the two arms 17 and 18 would be in phase. Regardless of whether the isolator 13 is connected to the series or the shunt arm, the phase shifter 21 may be adjusted either so that the energy in guides 23 and 27 is in phase or so that it is out of phase. If out of phase, then the magic tee 33 should be connected as shown, while if in phase, the shunt arm should contain the resistive load and the output should be taken from the series arm. As other examples, the magic tees can be replaced by other hybrid junctions, such as directional couplers or ring couplers. The microwave components such as the magic tees, the ferrite modulator, and the waveguides can be replaced by their lower frequency counterparts. The hybrid junction 15 is not essential, since it serves only as a power divider but at microwave frequencies the magic tee is convenient. The signal from conductor 39 need not control the modulator, but could control an attenuator in either transmission path. Many other modifications will occur to those skilled in the art. It is therefore desired that the invention be limited only by the true scope of the appended claims.

What is claimed is:

1. Electrical apparatus comprising, a first source of electrical oscillations, a second source of electrical oscillations, two transmission paths connected to said first source, means for modulating the energy in one of said paths with the energy from said second source, a four-armed hybrid junction having two opposite arms connected to said transmission paths, means for sampling the energy in one of the remaining arms of said hybrid junction, and means responsive to energy at the frequency of said first source appearing in said sampling means for adjusting the amplitude of the energy in one of said transmission paths.

2. Electrical apparatus comprising, a first source of electrical oscillations, a second source of electrical oscillations, two transmission paths connected to said first source, means for modulating the energy in one of said paths with the energy from said second source, a four-armed hydrib junction having two opposite arms connected to said transmission paths, means for detecting a portion of the energy in one of the remaining arms, and means responsive to energy at the frequency of said second source at the output of said detecting means for controlling the amplitude of the energy in one of said transmission paths.

3. Electrical apparatus comprising, a first source of electrical oscillations, a second source of electrical oscillations, two transmission paths connected to said first source, means for modulating the energy in one of said paths with the energy from said second source, a four-armed hybrid junction having two opposite arms connected to said transmission paths, means for detecting a portion of the energy in one of the remaining arms, and means responsive to energy at the frequency of said second source at the output of said detecting means for controlling said modulating means.

4. Electrical apparatus comprising a first source of electrical oscillations at a carrier frequency, a second source of electrical oscillations at a signal frequency, two transmission paths connected to said first source, means for modulating the energy in one of said paths with the energy from said second source whereby energy is derived at the carrier frequency and in sidebands having frequencies equal to the sum and to the difference between said carrier and signal frequencies, means for adjusting the relative phase and amplitude of the energy in said paths, a four-armed hybrid junction having two opposite arms connected to said transmission paths, means for detecting a portion of the energy in one of the remaining arms, and means responsive to energy at the frequency of said second source at the output of said detecting means for controlling said modulating means.

5. Electrical apparatus comprising a first source of electrical oscillations at a carrier frequency, a second source of electrical oscillations at a signal frequency, two transmission paths connected to said first source, means for modulating the energy in one of said paths with the energy from said second source whereby energy is derived at the carrier frequency and in sidebands having frequencies equal to the sum and to the difference between said carrier and signal frequencies, means for adjusting the relative phase and amplitude of the energy in said paths, a four-armed hybrid junction having two opposite arms connected to said transmission paths, a rectifier for detecting a portion of the energy in one of the remaining arms whereby energy at said signal frequency is derived, means for comparing the phase of the energy derived from said rectifier with the phase of the energy of said second source, and means responsive to the output of said phase comparing means for controlling the amplitude of the energy in one of said transmission paths.

6. Electrical apparatus comprising a first source of electrical oscillations at a carrier frequency, a second source of electrical oscillations at a signal frequency, two transmission paths connected to said first source, means for modulating the energy in one of said paths with the energy from said second source whereby energy is derived at the carrier frequency and in sidebands having frequencies equal to the sum and to the difference between said carrier and signal frequencies, means for adjusting the relative phase and amplitude of the energy in said paths, a four-armed hybrid junction having two opposite arms connected to said transmission paths, a rectifier for detecting a portion of the energy in one of the remaining arms, a filter connected to the output circuit of said rectifier for passing energy at said signal frequency, a phase detector for comparing the phase of the output of said filter with the output of said second source, and means responsive to the output of said phase detector for controlling the amplitude of the energy in one of said transmission paths.

7. Electrical apparatus comprising a source of microwave carrier energy, means for propagating said microwave energy through first and second waveguide transmission paths, a ferrite rotator in said first path, a source of signal oscillations connected to said ferrite rotator for varying the attenuation of the microwave energy flowing therethrough whereby the microwave energy is amplitude modulated at the signal frequency, manual means for adjusting the relative phase and amplitude of the energy in said paths, a waveguide hybrid junction having opposite arms connected to said transmission paths, an absorptive load terminating one adjacent arm, an output circuit connected to the other adjacent arm, whereby said output circuit contains energy at the sideband frequencies with the carrier frequency attenuated, and means responsive to the presence of vestigial carrier in said output circuit for automatically controlling the relative amplitude of the energy in said paths.

8. Electrical apparatus comprising a source of microwave carrier energy, means for propagating said microwave energy through first and second waveguide transmission paths, a ferrite rotator in said first path, a source of signal oscillations connected to said ferrite rotator for varying the attenuation of the microwave energy flowing therethrough whereby the microwave energy is amplitude modulated at the signal frequency, manual means for adjusting the relative phase and amplitude of the energy in said paths, a waveguide hybrid junction having opposite arms connected to said transmission paths and an absorptive load terminating one of the adjacent arms whereby the remaining adjacent arm contains energy at the sideband frequencies with the carrier frequency attenuated, a rectifier energized by a portion of the energy in said remaining adjacent arm for deriving energy at the signal frequency and means responsive to the phase and amplitude of said derived energy for automatically controlling the relative amplitude of the energy in said transmission paths.

9. A microwave suppressed carrier modulation system comprising, a source of microwave carrier oscillations, a first waveguide hybrid junction having a first arm connected to said source, an absorptive load terminating the opposite arm, a waveguide transmission path connected to each adjacent arm, a controllable ferrite microwave polarization rotator in one of said paths, a source of oscillations at a signal frequency connected to control said ferrite rotator whereby the microwave energy in said path is amplitude modulated at the signal frequency and includes carrier and sideband frequencies, manually operable means for adjusting the relative phase and amplitude of the energy in said transmission paths, a second waveguide hybrid junction having collinear arms connected to said transmission paths and an absorptive load terminating the series arm whereby the shunt arm contains energy at said sideband frequencies with only a vestigial carrier remaining, a rectifier for detecting a portion of the energy in said shunt arm, a filter connected to the output of said rectifier for passing only energy at said signal frequency, a phase detector having inputs connected to said filter and to said source of oscillations at a signal frequency for comparing the phase of the two inputs, and means responsive to the output of said phase detector for automatically controlling the relative amplitude of the energy in said transmission paths.

References Cited in the file of this patent

UNITED STATES PATENTS

| | | |
|---|---|---|
| 2,186,958 | Collins | Jan. 16, 1940 |
| 2,447,543 | Smullin | Aug. 24, 1948 |
| 2,644,930 | Luhrs et al. | July 7, 1953 |